United States Patent [19]

Winters

[11] 4,067,451
[45] Jan. 10, 1978

[54] ROLL FLIP MACHINE

[76] Inventor: William L. Winters, 2975 Haywood Ave., Chattanooga, Tenn. 37415

[21] Appl. No.: 733,791

[22] Filed: Oct. 19, 1976

[51] Int. Cl.$^2$ .............................................. B65G 7/00
[52] U.S. Cl. .................................. 214/1 Q; 198/413; 214/130 C; 214/DIG. 4
[58] Field of Search ............ 214/1 Q, 130 C, DIG. 4, 214/1 QG, 6 C, 91 R, 130 R, 130 A, 314, 312, 318, 332, 372, 620, 621, 700, DIG. 3, 701 P; 198/211, 412, 413; 254/8 R, 8 B, 123, 124

[56] References Cited

U.S. PATENT DOCUMENTS

| | | | |
|---|---|---|---|
| 2,278,140 | 3/1942 | Sieger | 214/130 C X |
| 2,431,589 | 11/1947 | Shuler | 214/620 |
| 3,583,575 | 6/1971 | Jowsey | 214/130 C X |
| 3,685,797 | 8/1972 | Orr | 254/8 B |

FOREIGN PATENT DOCUMENTS 226,351  1/1960  Australia .............................. 214/130

*Primary Examiner*—Trygve M. Blix
*Assistant Examiner*—George F. Abraham
*Attorney, Agent, or Firm*—Lamont Johnston

[57] ABSTRACT

An improved apparatus for upending a work piece is disclosed which achieves a greater driving torque during the early portion of the actuation thereof. The apparatus consists of a base member supporting a first and second horizontal pivot shafts which are mutually parallel and spaced from one another. A carriage member is pivotally mounted on the first shaft, having a first end of a lever arm mounted thereto and a second end located proximate to the second pivot shaft. A linear driving means has a housing with a first end proximate to the lever arm pivotally mounted on the second pivot shaft. The housing contains a linear driving member having a force transmitting end pivotally connected to the second end of the lever arm. The housing rotates about the second pivot shaft during the early portion of the actuation of the linear driving means. In this manner, a greater torque may be applied to the carriage by the linear driving means during the early portion of the actuation thereof.

11 Claims, 5 Drawing Figures

IMPROVED FRONT MOUNT

PRIOR ART BACK MOUNT 4,067,451

ROLL FLIP MACHINE

FIELD OF THE INVENTION

The invention disclosed generally relates to an apparatus for upending a work piece and is more particularly related to an apparatus for accomplishing the upending of rolls of paper or the like.

BACKGROUND OF THE INVENTION

The load torque of a workpiece to be upended varies as the cosine of the angle with respect to the horizontal, of the radius vector directed from the lifting fulcrum to the center of gravity of the load. The load torque increases to a maximum when the work piece has been lifted so that the center of gravity is horizontally level with the lifting fulcrum and then decreases as the upending operation is completed. The upending of large rolls of paper and the like having a center of gravity relatively close to the level of the lifting fulcrum, requires a relatively large initial drive torque to bring the center of gravity of the roll above the fulcrum of the upending apparatus. Prior art examples of upending apparatus have employed cumbersome auxilliary lever systems to increase the initial driving torque applied to the carriage moving the work piece. These prior art systems must be located adjacent to a sunken portion of the supporting floor so as to accommodate the motion of the auxilliary lever systems. Such a requirement precludes the convenient portability of the upending apparatus from one location to another.

OBJECTS OF THE INVENTION

It is therefore an object of the invention to upend a work piece in an improved manner.

It is a further object of the invention to upend a large work piece more efficiently than has been possible in the prior art.

It is another object of the invention to upend a work piece by applying a greater initial driving torque, in an improved manner.

It is still another object of the invention to upend a work piece which is randomly located, by transporting to the work piece, an apparatus which can apply a greater initial driving torque to the work piece.

SUMMARY OF THE INVENTION

These and other objects, features, and advantages of the invention are accomplished by the roll flip machine disclosed herein which applies a greater torque during the early portion of the upending of the work piece. The roll flip machine invention comprises a base member supporting a first and second pivot shafts mutually parallel to and spaced from one another. A carriage member is pivotally mounted on the first shaft and has the first end of a lever arm mounted thereto and the second end of the lever arm located proximate to the second pivot shaft. A linear driving means having a housing with a first end proximate to the lever arm is pivotally mounted on the second pivot shaft. The housing contains a linear driving member having a force transmitting end pivotally connected to the second end of the lever arm. The housing rotates about the second pivot shaft to enable the linear driving member to form an approximately tangential angle with respect to the arc described by the second end of the lever during the early portion of the actuation of the linear driving means. In this manner, a greater torque may be applied to the carriage by the linear driving means during the early portion of the actuation of the apparatus.

DESCRIPTION OF THE FIGURES

These and other objects, features and advantages of the invention will be more particularly understood with reference to the accompanying drawings.

Figure 1:
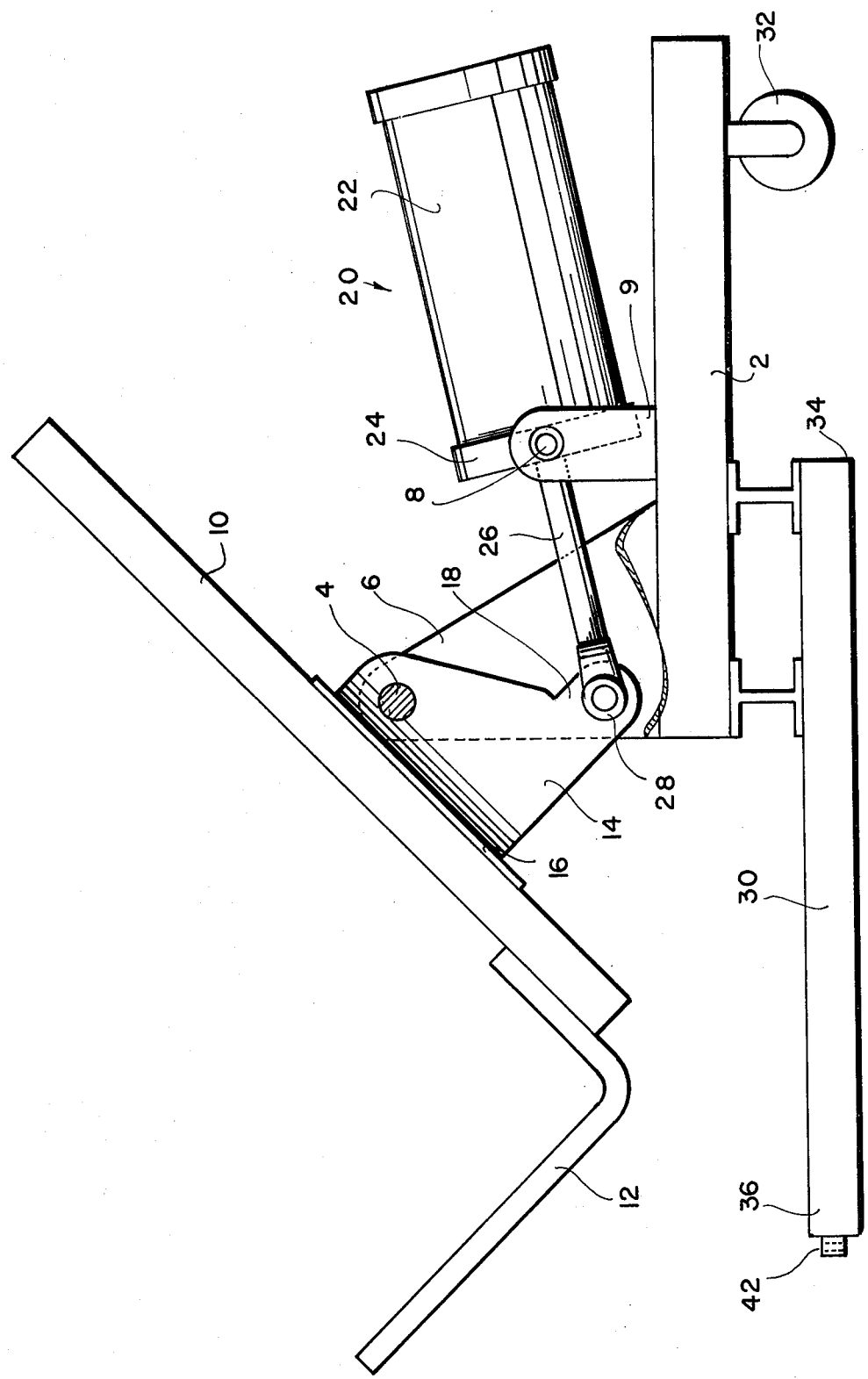
FIG. 1 illustrates a side view of the roll flip machine with the foreground one of a pair of support members 6 cut away to show the details of the lever 14 with the drive cylinder 22 extending the driving member 26 halfway.
Figure 2:
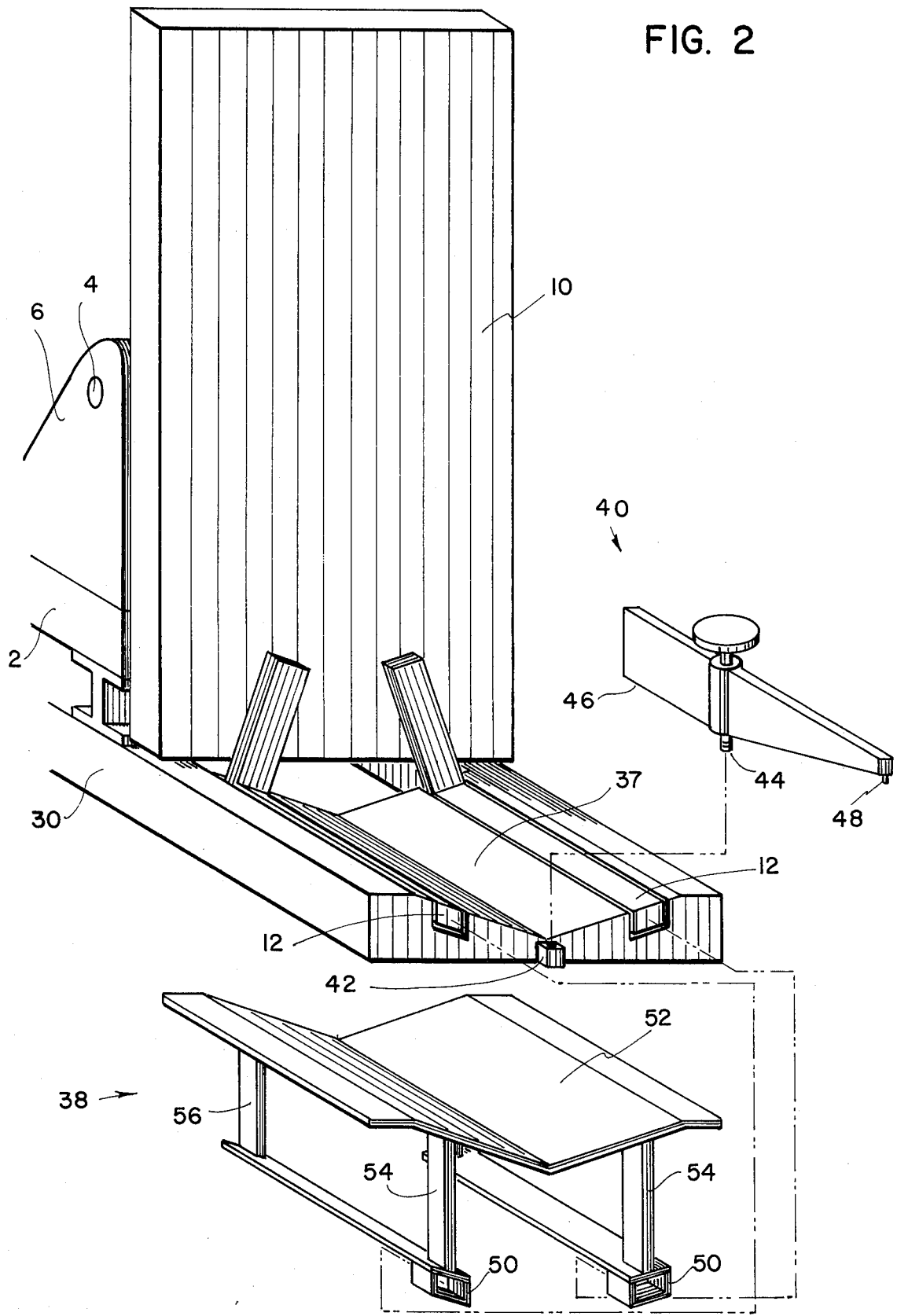
FIG. 2 illustrates a front isometric view of the roll flip machine with the carriage 10 in its vertical position and an exploded view of the hitch 40 and the elevated platform 38 as they relate to the foundation member 30 and carriage fork 12, respectively.

DISCUSSION OF THE PREFERRED EMBODIMENT:

FIGS. 1 and 2 illustrate various views of the roll flip machine invention. FIG. 1 shows a side view with the foreground one of a pair of support members 6 cut away to show details of the lever 14 with the driving cylinder 22 extending the driving member 26 halfway. FIG. 2 shows a frontal isometric view with the carriage 10 in its vertical position and an exploded view of the hitch 40 and the elevated platform 38 as they relate to the foundation member 30 and carriage fork 12, respectively. The roll flip machine comprises a base member 2 having a pair of support members 6 mounted thereto upon which is mounted a first horizontal pivot shaft 4 which serves as the fulcrum for the carriage 10. The base member 2 has a trunion mounting 9 on which is supported a second horizontal pivot shaft 8 which serves as the pivotal mounting for the drive cylinder 22. The first and second horizontal pivot shafts 4 and 8 are mounted parallel to and are spaced from one another.

The lever arm 14 is pivotally mounted at a first end on the first pivot shaft 4. The carriage member 10 is pivotally mounted on the first pivot shaft 4 by means of the lever arm 14 having a portion 16 bolted to the carriage member 10. A second end 18 of the lever arm 14 is located proximate to the second pivot shaft 8 when the apparatus is in its fully retracted position.

The linear driving means generally shown as 20 can be a hydraulic cylinder or a pneumatic cylinder having a housing 22 with a first end 24 proximate to the lever arm 14, pivotally mounted in the trunion mount 9 on the second pivot shaft 8. The housing 22 contains a linear driving member 26 having a force transmitting end 28 which, in the preferred embodiment, is a clevis coupling. The force transmitting end 28 is pivotally connected to the second end 18 of lever arm 14.

Figure 3A:
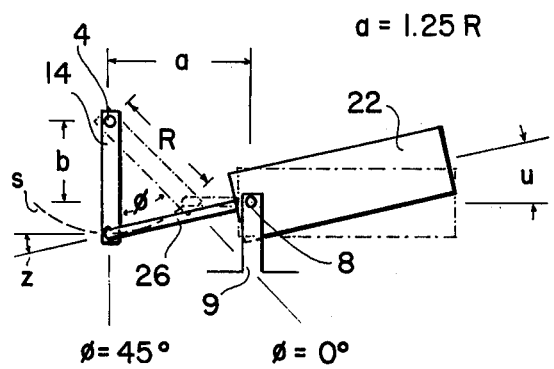
FIG. 3a is a schematic illustration of the mounting of the drive cylinder 22 at its frontward extremity in a trunion 9, according to the invention.

FIG. 3a is a schematic illustration of the mounting of the drive cylinder 22 at its frontward extremity 24 in the trunion mount 9, according to the invention. As shown in FIG. 3a, the housing 22 rotates about the second pivot shaft 8 to enable the linear driving member 26 to form an approximately tangential angle z with respect to the arc s described by the second end 18 of the lever 14 during the early portion of the actuation of the linear driving means 20. In this manner, a greater driving torque may be applied to the carriage 10 by the linear driving means 20 during the early portion of the operation of the roll flip machine.

In its preferred embodiment, the lever 14 will have a length of R and the horizontal spaced parallel distance a between the first pivot shaft 4 and the second pivot shaft 8 is greater than R and less than 3R.

Figure 3B:
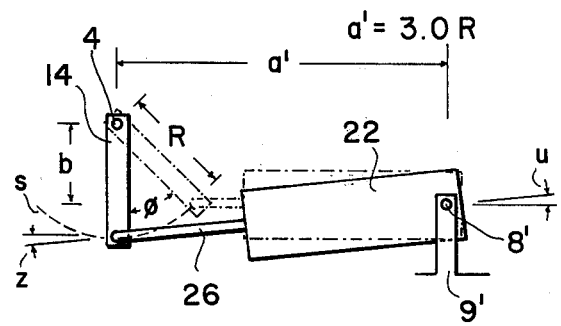
FIG. 3b is a schematic diagram of the prior art mounting of the drive cylinder 22 at its rearward extremity.

FIG. 3a illustrates a schematic diagram of the roll flip machine invention with the drive cylinder housing 22 front-mounted in the trunion 9. FIG. 3b illustrates a schematic diagram of the drive cylinder housing 22 with its rearward portion pivotally mounted in the support 9′ as in the prior art. In both FIGS. 3a and 3b, the cylinder driving member 26 drives the lever 14 through the circular arc s and assumes an approximately tangential angle z with respect to the arc s. The corresponding angle of the axis of the housing 22 with respect to the horizontal is u. The horizontal separation distance between the first pivot shaft 4 and second pivot shaft 8 is a and the vertical separation distance is b. The angle assumed by the lever 14 with respect to its starting position is $\phi$. The preferred starting position for the lever 14 is at 45° from the vertical, as is shown in FIG. 3a. The length of the lever arm 14 is R. It can be shown that the relationship between the angles z and $\phi$ and the distances R, a, and b can be represented by the equation:

$$\cos z = \cos\left[\Theta - \arctan\left(\frac{R\cos\Theta - b}{a - R\sin\Theta}\right)\right],$$

where $\theta = 45° - \phi$.

Figure 3C:
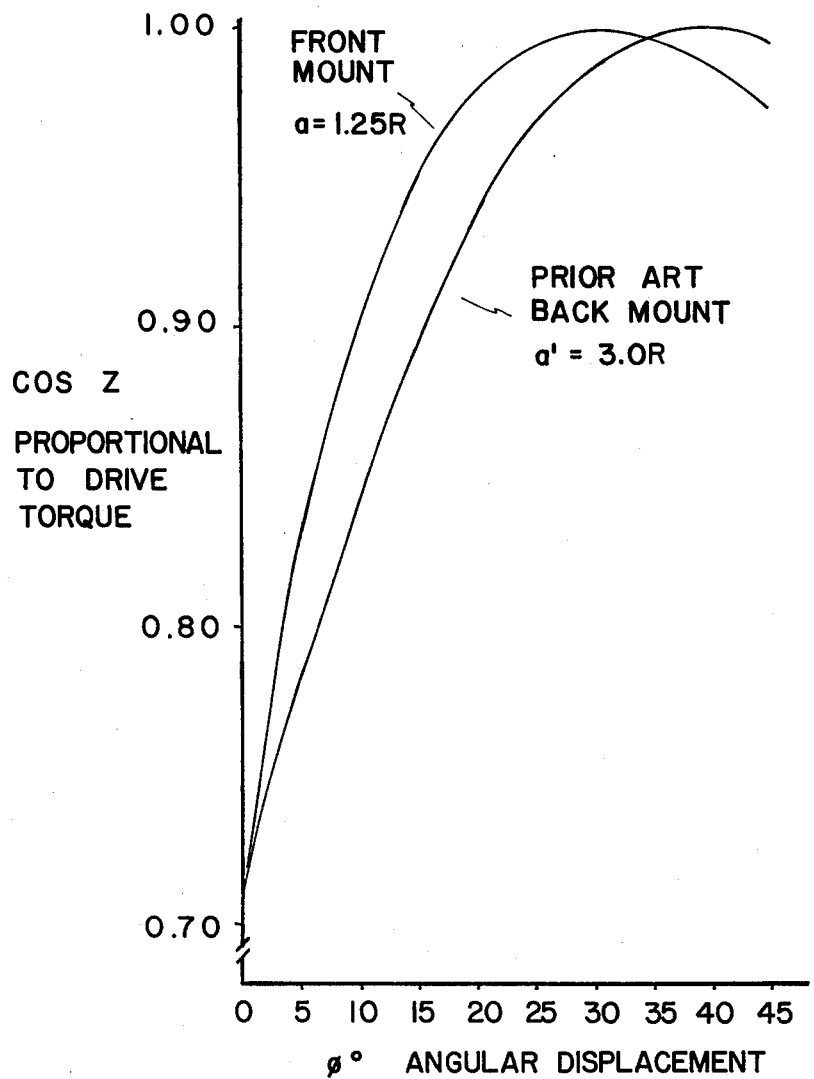
FIG. 3c are graphs of the driving torque produced by the driving cylinders 22 which are front-mounted according to the invention as in FIG. 3a and rear-mounted according to the prior art as in FIG. 3b.

FIG. 3c is a graphical comparison of the above equation for two values of a, the first value of a being 1.25 R corresponding to the roll flip machine invention schematic configuration of FIG. 3a and the second value of a being 3.0 R representing the prior art rearward mounted cylinder configuration of FIG. 3b. The graphs are plots of the value of cosine z which is proportional to the drive torque applied by the linear driving member 26 to the lever 14, versus the angular displacement $\phi$ of the lever 14 from its initial position.

It is seen from the graphical comparison of FIG. 3c that for a front trunion mounting of the cylinder housing 22 as is employed in the roll flip machine invention, the magnitude of the driving torque is greater during a substantially earlier portion of the cycle of operation of the apparatus, reaching a maximum torque at approximately $\phi = 30°$ of angular displacement, that is the case when the cylinder 22 is mounted at the rearward portion thereof as is shown in FIG. 3b, where it reaches a maximum torque later at approximately $\phi = 40°$ of angular displacement. This greater torque which is achieved during an earlier portion of the actuation of the apparatus, arises from the rotation of the drive cylinder housing 22 about the second pivot shaft 8 so as to enable the linear driving member 26 to form a tangential angle z with respect to the arc s described by the second end 18 of the lever 14 during the early portion of the actuation of the linear driving means 20. This earlier application of the greater driving torque permits the upending of greater loads more efficiently than can be accomplished by prior art apparatus.

Additional features of the roll flip machine can be seen with reference to FIG. 1. There is seen that the base member further comprises a foundation member 30 extending below the carriage member 10 to prevent over-tipping of the apparatus. The base member further comprises a wheel member 32 supported by the base member opposite to the foundation member 30 in a non-contacting relationship with the ground while the foundation member 30 contacts the ground. The apparatus will pivot about the end 34 of the foundation member 30 proximate to the wheel 32 through lifting of the distal end 36 of the foundation member 30 off the ground, which causes the wheel member 32 to contact the ground. In this manner, the wheel 32 becomes the supporting means for the apparatus, imparting the quality of portability thereto.

A further feature seen in FIG. 1 is that the carriage member further comprises the back member 10 pivotally mounted to the first pivot shaft 4 and a carriage fork member 12 mounted to the back member 10 proximate to and parallel with the ground for supporting the work piece. FIG. 2 shows how the fork members 12 fit into grooves in a first platform member 37 which is generally a v-shaped surface which is concave upward for supporting a roll stock work piece on its circumferential edge.

FIG. 2 illustrates a second, elevated platform member 38 which is an attachment to be mounted by means of the couplings 50, onto the fork members 12 as shown in the exploded view and supported by the leg members 54 and 56 so as to be spaced from and parallel with the ground, for supporting the work piece at a desired elevation from the ground. The second platform 38 has a generally v-shaped and concave upward surface 52 for supporting a roll-stock work piece on its circumferential edge. The elevated platform 38 may be used for supporting the work piece at an elevation such that the initial height of its center of gravity is closer to the lever of the load's fulcrum, that is shaft 4, thereby causing the maximum load torque to occur earlier in the lifting cycle as described above. In this manner, the load torque curve for work pieces with a low center of gravity can be more nearly matched to the drive torque curve of the roll flip machine invention, shown in FIG. 3c. In addition, the elevated surface 52 can facilitate the transfer of the work piece from the roll flip machine to a subsequent processing station having a receiving platform at a similar elevation.

FIG. 2 illustrates still another feature of the invention which is the hitch 40 which will attach to the threaded coupling member 42 by means of the screw coupling 44 to facilitate lifting the distal end 36 of the foundation member 30 by means of raising end 48 thereby causing end 46 to impart a lifting moment to foundation member 30, to enable the towing of the apparatus from place to place.

The roll flip machine invention disclosed herein constitutes a substantial improvement over similar machines in the prior art by virtue of its capacity to generate a greater driving torque during an earlier portion of its operation by a mechanical means which is more compact and efficient than the apparatus of the prior art and which is more conveniently portable than prior art machines.

It will be understood that variations and modifications may be effected without departing from the spirit and scope of the novel concepts of this invention.

I claim:

1. Apparatus for upending a work piece having a relatively low center of gravity, comprising:
   a base member having forward and rearward portions, supporting first and second horizontal pivot shafts, said first pivot shaft elevated with respect to the center of gravity of said work piece, said first shaft parallel to, elevated with respect to and spaced forward with respect to said second shaft;
   a carriage member pivotally mounted on said first pivot shaft, having the first end of a lever arm mounted thereto and the second end located proximate to said second pivot shaft, said carriage having a base portion being substantially horizontal for supporting said work piece and a back portion being substantially vertical when said carriage is in a first position for loading said work piece, said lever oriented rearwardly at an angle of approximately 45° with respect to vertical when said carriage is in said first position for loading said work piece;
   a linear driving means having a housing with a forward end proximate to said lever arm pivotally mounted on said second pivot shaft, said housing containing a linear driving member oriented substantially horizontally when said carriage is in said first position, having a force transmitting end pivotally connected to said second end of said lever arm, for applying a forwardly directed driving force;
   said linear driving means forcing said second end of said lever forward, rotating said carriage into a second position where said base portion is substantially vertical and said back portion is substantially horizontal, lifting the center of gravity of said work piece above the elevation of said first pivot shaft, upending said work piece, said lever oriented forwardly at an angle of approximately 45° with respect to vertical when said carriage is in said second position, said second end of said lever describing an arc about said first pivot shaft during the motion of said carriage from said first to said second position, causing said housing to rotate about said second pivot shaft to enable said linear driving member to form an approximately tangential angle with respect to said arc described by said second end of said lever during the early portion of the actuation of said linear driving means;
   whereby a greater driving torque may be applied to said carriage by said linear driving means during the early portion of the actuation thereof more closely matching the driving torque capacity of the linear driving means to the load torque requirements of upending a work piece with a center of gravity at an initial lesser elevation than said first pivot shaft.

2. The apparatus of claim 1, wherein:
   said lever has a length of R;
   said spaced parallel distance between said first and second pivot shafts is greater than R and less than 3R.

3. The apparatus of claim 1, wherein:
   said linear driving means is a pneumatic cylinder.

4. The apparatus of claim 1, wherein:
   said linear driving means is a hydraulic cylinder.

5. The apparatus of claim 1, wherein said base member further comprises:
   a foundation member extending below said carriage member to prevent over-tipping of the apparatus.

6. The apparatus of claim 5, wherein:
   said base member further comprises a wheel member supported by said base member opposite to said foundation member in non-contacting relationship with the ground while said foundation member contacts the ground;
   said apparatus pivoting about the end of said foundation member proximate to said wheel through lifting the distal end of said support member off the ground causing said wheel member to contact the ground;
   whereby said wheel becomes the supporting means for the apparatus, imparting portability thereto.

7. The apparatus of claim 1, wherein said carriage member further comprises:
   a back member pivotally mounted to said first pivot shaft;
   a fork member mounted to said back member proximate to and parallel with the ground, for supporting said work piece.

8. The apparatus of claim 7, wherein:
   said base member has a surface which is generally v-shaped and concave upward with grooves therein where said fork member may rest, for supporting a roll-stock work piece on its circumferential edge.

9. The apparatus of claim 7, wherein said carriage member further comprises:
   an elevated platform member mounted to said fork member and supported by legs so as to be spaced from and parallel with the ground, for supporting said work piece at a desired elevation from the ground.

10. The apparatus of claim 9, wherein:
    said elevated platform member is generally v-shaped and concave upward, for supporting a roll-stock work piece on its circumferential edge.

11. The apparatus of claim 6 which further comprises:
    a hitching means connected to said distal end of said foundation member for lifting and towing the apparatus.

* * * * *